United States Patent Office.

EDWARD F. CRUSÉ, OF NEWARK, NEW JERSEY.

PREPARATION OF GLUE-STOCK FROM BONES, HORN-PITHS, &c.

SPECIFICATION forming part of Letters Patent No. 291,802, dated January 1, 1884.

Application filed November 1, 1883. (No specimens.)

*To all whom it may concern:*

Be it known that I, EDWARD F. CRUSÉ, a citizen of the United States, residing at Newark, in the county of Essex and State of New Jersey, have invented certain new and useful improvements of the processes connected with the preparation of glue-stock from bones, horn-piths, fish-scrap, and all such other material which contains calcic phosphate in combination with osseine or gelatine; and I do hereby declare that the following is a full, clear, and exact description of the invention, which will enable others skilled in the art to which it appertains to make and use the same.

My invention relates to the improvements in the preparation of glue-stock from bones, horn-piths, &c., when muriatic acid is used for the decomposition of calcic phosphate and other calcareous combinations contained in the material used.

Heretofore, in the preparation of bones, horn-piths, &c., for glue-stock, when muriatic acid is used, this acid has not been recovered to be used again, except in one instance, where it has been attempted to recover the acid by distillation and condensation. In this case, to the solution resulting from the decomposition of bones, horn-piths, &c., with muriatic acid, and which contains calcic chloride and phosphate, muriatic and phosphoric acids, and a large amount of organic matter in solution and suspension, and also other impurities, sulphuric acid is added. The solution then is boiled and the escaping muriatic acid is condensed.

The object of my invention is, in using muriatic acid for the preparation of glue-stock from bones, horn-piths, &c., first, to recover the muriatic acid, so as to use it again for the further decomposition of bones, horn-piths, &c., without the tedious and difficult process of distillation and condensation; and, secondly, to manufacture at the same time a useful compound, valuable for many arts, especially as paper-pulp, soap-filler, paint, &c.

To carry my invention into effect, after the bones, horn-piths, &c., have been subjected to the usual process of decomposition with muriatic acid, my first step is to separate from the resulting solution the calcic phosphates, phosphoric acid, and particularly all the organic matter held in solution or suspension, and other impurities carried into the solution, with the commercial muriatic acid—as ferric chloride, &c.—leaving a clear, colorless, and pure solution of calcic chloride. For this purpose I first neutralize the acid phosphates, phosphoric and muriatic acids with calcic carbonate, which I use in the form of a very fine powder, and I then add calcic hydrate (also as a fine powder or in the form of a thick milk of lime) for the precipitation of the organic matter and other impurities. The use of the calcic carbonate can be dispensed with, and calcic hydrate used in its place. I only prefer the carbonate in order to avoid an undesirable dilution of the liquid. The quantity of lime in either form to be used depends on the quantity of the free acids, acid phosphate, and particularly of the organic impurities, the point when the separation is perfect to be determined by filtering a small sample, which must give a clear and colorless filtrate. Calcic hydrate is to be added until this point is reached.

I am well aware that in some instances calcic hydrate has been used in a solution resulting from the decomposition of bones, &c., with the aid of muriatic acid; but this has been done simply to obtain the phosphates from this solution, and the quantity of calcic hydrate used has been limited to this precipitation, where I have to use an excess of calcic hydrate in order to have the calcic-chloride solution clear and entirely colorless. I now separate the precipitate from the filtrate by any of the means well known for such purpose, using filters, presses, or filter-presses. After the precipitate is separated it is further treated for any of the well-known useful purposes. The filtrate—the clear, colorless, and pure solution of calcic chloride—I then decompose with the aid of sulphuric acid, after the formula $CaCl_2 + SO_4H_2 + 2H_2O + aqua = CaSO_4 + 2H_2O + 2ClH + aqua$. For this purpose I use a wooden vessel provided with a suitable stirring apparatus, and I subject the solution of calcic chloride to a violent agitation, allowing at the same time a small stream of sulphuric acid continually to run into it until the quantity of sulphuric acid used is sufficient to decompose the calcic chloride.

In order to obtain the precipitate of calcic sulphate with two equivalents of water in the most desirable form, the calcic-chloride solution, as well as the sulphuric acid, should be of a medium strength—that is, the calcic-chloride solution, of a specific gravity of from 1.080 to 1.200, and the sulphuric acid of a specific gravity from 1.200 to 1.400. However, I do not confine myself to these limits, as in some cases weaker or stronger solutions may be used. The precipitate thus obtained is of snowy-white and fibrous appearance—calcic sulphate with two equivalents of water—and is very useful as paper-pulp, soap-filler, paints, &c., and the filtrate contains the muriatic acid originally used, with some gypsum, which is sparingly soluble. I separate this precipitate from the filtrate in a similar manner as the first precipitate is separated from the calcic-chloride solution. I prefer to use wooden vessels provided with perforated false bottoms covered with a filtering-cloth. After the last traces of the solution of muriatic acid are removed, the precipitate is ready for use in the form of a paste, or can be dried in any kind of drying apparatus.

The filtrate, a solution of muriatic acid with some calcic sulphate, (gypsum,) is at once ready to be used again for the decomposition of bones, horn-piths, &c.

Having thus fully described my invention, I do not claim the treatment of bones, horn-piths, &c., with muriatic acid, in general. I also do not claim the treatment of the liquid resulting from the decomposition of bones, &c., by the aid of muriatic acid with calcic carbonate or hydrate for the purpose of obtaining calcic phosphates; but

What I do claim, and what I desire to secure by Letters Patent, is—

The process herein described of treating the mother-liquid resulting from the treatment of bones, &c., with hydrochloric acid, in the manufacture of glue, the same consisting in adding to said liquid calcic carbonate until the liquid is neutralized; then adding calcic hydrate to precipitate organic matter; then separating the clear calcic chloride from the precipitated impurities; then decomposing the pure calcic chloride by means of sulphuric acid; and, finally, separating the precipitated calcic sulphate and the free hydrochloric acid, by filtration, for use, substantially as specified.

EDWARD F. CRUSÉ.

Witnesses:
 JOHN R. HARDIN,
 RICHARD F. CONOVER.